3,244,664
SILICON-CONTAINING POLYMERS
Robert P. Zelinski and Carl A. Uraneck, Bartlesville, Okla., assignors to Phillips Petroleum Company, a corporation of Delaware
No Drawing. Filed Oct. 24, 1960, Ser. No. 64,277
21 Claims. (Cl. 260—41.5)

This invention relates to a method of preparing polymers which contain silicon and to the product of this method. In another aspect it relates to a method of preparing silicon-containing polymers and coupling and/or curing the resulting polymers and to the resulting product.

It has been disclosed in copending application Serial No. 772,167 of Uraneck, Short, Hsieh and Zelinski, filed Nov. 6, 1958, now Patent No. 3,135,716 that highly useful polymeric products can be obtained by polymerizing vinylidene-containing monomers in the presence of an organo alkali metal catalyst and subsequently reacting the resulting polymer containing active alkali metal end groups with a reagent which will couple the polymer molecules or replace the alkali metal with more stable reactive end groups. The utilization of these reactive terminal substituents on the polymer molecule enables substantially more effective cures since all of the molecule can be tied into the cross-linked structure. Also by simple coupling arrangements alone or with auxiliary curing, liquid polymers can be readily converted into solids and soft tacky rubber can be made quite rigid. The term "telechelic" has been coined to define these terminally reactive polymers. As used in this specification, telechelic polymers means polymers of vinylidene-containing monomers which contain a reactive group upon each end of the polymer molecule. By employing a suitable initiator, polymers can be prepared which contain reactive groups on only one end of the polymer molecule, in which case the term "semi-telechelic" is used to denote these polymers.

According to our invention a polymer is provided which contains reactive end groups containing silicon. This silicon-containing polymer can be reacted with suitable reagents to couple the polymer molecules and thereby substantially increase the molecular weight of the polymer, or through cross-linking at the sites of the reactive silicon-containing terminal groups to produce a highly useful cured polymeric product. According to our invention such a product is provided by reacting a polymer which is a polymerizate of a vinylidene-containing monomer and contains at least one terminal alkali metal atom per molecule with a silicic compound which is either a silicon halide or silicon ester or analogous material employing nitrogen or sulphur in place of oxygen. These silicic compounds include silicon tetrahalides as well as silanes and siloxanes containing at least two substituents per molecule which are halogen, OR, $NR_2$, or SR where R is hydrogen or a hydrocarbon radical. The resulting polymer which contains at least one silicon-containing terminal group can be subsequently reacted with a reagent such as a polyalkalimetal organic compound or a monobasic acid or a compound which contains at least 2 hydrogen atoms per molecule joined to oxygen, nitrogen or sulfur atoms. In this manner the silicon-containing polymers can be coupled and/or cured either with the above defined reagent alone or in combination with auxiliary curatives such as are normally used in the curing of rubber.

It is an object of our invention to provide a method of preparing polymeric products that contain silicon.

Another object of our invention is to provide a polymer of a conjugated diene containing silicon in which all of the unsaturation originally incorporated in the polymer is still present after addition of the silicon.

Another object of our invention is to provide a silicon-containing polymer which can be coupled and/or cured to provide polymers of increased molecular weight or cross-linked structure and to provide a method of thus modifying the silicon-containing polymers.

Another object is to provide a compounded and cured silicon-containing rubbery polymer which has high tensile strength and relatively low heat build-up on flexing.

Other objects, advantages and features of our invention will be apparent to those skilled in the art from the following disclosure.

The polymers which contain terminally reactive alkali metal atoms can be prepared from a wide variety of monomers. The preferred monomers are the conjugated dienes containing from 4 to 12 carbon atoms per molecule and preferably 4 to 8 carbon atoms per molecule. Examples of these compounds include the following: 1,3-butadiene, isoprene, 2,3-dimethyl-1,3-butadiene, 1,3-pentadiene (piperylene), 2-methyl-3-ethyl-1,3-butadiene, 3-methyl-1,3-pentadiene, 2-methyl-3-ethyl-1,3-pentadiene, 2-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-octadiene, phenyl-1,3-butadiene, 2,3-diethyl-1,3-butadiene, 2,3-di-n-propyl-1,3-butadiene, 2-methyl-3-isopropyl-1,3-butadiene and the like. Conjugated dienes containing halogen and alkoxy substituents along the chain can also be employed, such as chloroprene, fluoroprene, 2-methoxy-1,3-butadiene, 2-ethoxy-3-ethyl-1,3-butadiene, and 2-ethoxy-3-methyl-1,3-hexadiene. Conjugated dienes can be polymerized alone or in admixture with each other to form copolymers, or block copolymers. Block copolymers can be prepared from two or more conjugated dienes by charging one compound initially, allowing it to polymerize, and then adding a second conjugated diene and allowing it to polymerize. It is preferred that conjugated diolefins be employed in the practice of our invention and preferred monomers are butadiene, isoprene and piperylene.

In addition to the conjugated dienes we can practice our invention with other monomers containing a $CH_2=C<$ group such as the vinyl-substituted aromatic compounds. The vinyl-substituted aromatic compounds include styrene, 1-vinylnaphthalene, 2-vinylnaphthalene, and alkyl, cycloalkyl, aryl, alkaryl, aralkyl, alkoxy, arloxy, and dialkylamino derivatives thereof in which the total number of carbon atoms in the combined substituents is generally not greater than 12. Examples of these aromatic monomers include:

3-methylstyrene (3-vinyltoluene)
3,5-diethylstyrene
4-n-propylstyrene
2,4,6-trimethylstyrene
4-dodecylstyrene
3-methyl-5-n-hexylstyrene
4-cyclohexylstyrene
4-phenylstyrene
2-ethyl-4-benzylstyrene
4-p-tolylstyrene
3,5-diphenylstyrene
2,4,6-tri-tert-butylstyrene 2,3,4,5-tetramethylstyrene
4-(4-phenyl-n-butyl)styrene
3-(4-n-hexylphenyl)styrene
4-methoxystyrene
3,5-diphenoxystyrene
3-decoxystyrene
2,6-dimethyl-4-hexoxystyrene
4-dimethylaminostyrene
3,5-diethylaminostyrene
4-methoxy-6-di-n-propylaminostyrene
4,5-dimethyl-1-vinylnaphthalene
3-ethyl-1-vinylnaphthalene
6-isopropyl-1-vinylnaphthalene
2,4-diisopropyl-1-vinylnaphthalene
3,6-di-p-tolyl-1-vinylnaphthalene
6-cyclohexyl-1-vinylnaphthalene
4,5-diethyl-8-octyl-1-vinylnaphthalene
3,4,5,6-tetramethyl-1-vinylnaphthalene
3,6-di-n-hexyl-1-vinylnaphthalene
8-phenyl-1-vinylnaphthalene
5-(2,4,6-trimethylphenyl)-1-vinylnaphthalene
3,6-diethyl-2-vinylnaphthalene
7-dodecyl-2-vinylnaphthalene
4-n-propyl-5-n-butyl-2-vinylnaphthalene
6-benzyl-2-vinylnaphthalene
3-methyl-5,6-diethyl-8-n-propyl-2-vinylnaphthalene
4-o-tolyl-2-vinylnaphthalene
5-(3-phenyl-n-propyl)-2-vinylnaphthalene
4-methoxy-1-vinylnaphthalene
6-phenoxy-1-vinylnaphthalene
3,6-dimethylamino-1-vinylnaphthalene
7-dihexoxy-2-vinylnaphthalene and the like. These vinyl-substituted aromatic compounds can be used to form homopolymers or copolymers including block copolymers with each other or with conjugated dienes. The presence of a small amount of polar compound such as the solvent used in preparing the initiator encourages random copolymerization between conjugated dienes and the vinyl-substituted aromatic compounds.

Certain polar monomers can also be polymerized to for homopolymers or copolymers with each other. These polar monomers can be employed to form block copolymers with conjugated dienes and/or vinyl-substituted aromatic compounds. When preparing these block copolymers the polar monomer is introduced after the nonpolar monomers have polymerized. A detailed description of block copolymers containing terminal reactive groups and their method of preparation is set forth in the copending application of R. P. Zelinski, Serial No. 796,277, filed Mar. 2, 1959. These polar monomers include vinylpyridines and vinylquinolines in which the vinyl group is attached to a ring carbon other than a carbon in the beta position with respect to the nitrogen. These pyridine, quinoline or isoquinoline derivatives can contain substituents such as alkyl, cycloalkyl, aryl, alkaryl, aralkyl, alkoxy, aryloxy and dialkylamino groups in which the total number of carbon atoms in the combined substituents does not exceed 12. Any alkyl groups on the alpha or gamma carbons with respect to the nitrogen should be tertiary alkyl groups. Examples of polar monomers applicable include:

2-vinylpyridine
4-vinylpyridine
3,5-diethyl-4-vinylpyridine
5-methyl-2-vinylpyridine
5-n-octyl-2-vinylpyridine
3-n-dodecyl-2-vinylpyridine
3,5-di-n-hexyl-4-vinylpyridine
5-cyclohexyl-2-vinylpyridine
4-phenyl-2-vinylpyridine
3,5-di-tert-butyl-2-vinylpyridine
3-benzyl-4-vinylpyridine
6-methoxy-2-vinylpyridine
4-phenoxy-2-vinylpyridine
4-dimethylamino-2-vinylpyridine
3,5-dimethyl-4-diamylamino-2-vinylpyridine
2-vinylquinoline
4-vinylquinoline
2-tert-butyl-4-vinylquinoline
3-methyl-4-vinylqunoline
3-cyclohexyl-4-vinylquinoline
3-methyl-4-ethoxy-2-vinylquinoline
1-vinylisoquinoline
3-vinylisoquinoline
4-tert-dodecyl-1-vinylisoquinoline
3-dimethylamino-3-vinylisoquinoline
4-benzyl-3-vinylisoquinoline
4-phenyl-1-vinylisoquinoline and the like.

Other polar monomers include acrylic and alkacrylic acid esters, nitriles, and N,N-disubstituted amides, such as methyl acrylate, ethyl acrylate, butyl acrylate, methyl methacrylate, ethyl methacrylate, propyl methacrylate, butyl methacrylate, methyl ethacrylate, ethyl ethacrylate, isopropyl ethacrylate, acrylonitrile, methacrylonitrile, N,N-dimethylacrylamide, N,N-diethylmethacrylamide and the like. Vinylfuran and N-vinylcarbazole can also be used.

The terminally reactive polymers are prepared by contacting the monomer or monomers which it is desired to polymerize with an organo alkali metal compound. The organo alkali metal compounds preferably contain from 1 to 4 alkali metal atoms, and those containing 2 alkali metal atoms are more often employed. As will be explained hereinafter, lithium is the preferred alkali metal.

The organo alkali metal compounds can be prepared in several ways, for example, by replacing halogens in an organic halide with alkali metals, by direct addition of alkali metals to a double bond, or by reacting an organic halide with a suitable alkali metal compound.

The organo alkali metal compound initiates the polymerization reaction, the organo radical being incorporated in the polymer chain and the alkali metal being attached terminally to at least one end of the polymer chain. When employing polyalkali metal compounds an alkali metal is attached terminally at each end of the polymer chain. The polymers in general will be linear polymers having two ends; however, polymers containing more than two ends can be prepared within the scope of the invention. These polymers can be represented by the general formula $QM_n$ where Q comprises the polymer as previously described, M is an alkali metal and $n$ is an integer of 1 to 4.

The organo alkali metal initiators employed for preparing the polymers used in our invention can be represented by the formula $RM_x$ where R is a hydrocarbon radical selected from the group consisting of aliphatic, cycloaliphatic and aromatic radicals, M is an alkali metal including sodium, potassium, lithium, cesium and rubidium and $x$ is an integer of 1 to 4. The R in the formula generally contains from 1 to 20 carbon atoms although it is within the scope of the invention to use higher molecular weight compounds. By far the best results are obtained with organo lithium compounds which give very high conversions to the terminally reactive polymer. Lithium is, therefore, the preferred alkali metal for the polymerization initiator. Examples of mono- and polyalkali metal substituted hydrocarbons which can be employed for the polymerization initiator include methyllithium, n-butyllithium, n-decyllithium, phenyllithium, naphthyllithium, p-tolyllithium, cyclohexyllithium, 4-butylphenylsodium, 4-cyclohexylbutylpotassium, isopropylrubidium, 4-phenylbutylcesium, 1,4-dilithiobutane, 1,5-dipotassiopentane, 1,4-disodio-2-methylbutane, 1,6-dilithiohexane, 1,10-dilithiodecane, 1,15-dipotassiopentadecane, 1,20-dilithioeicosane, 1,4-disodio-2-butene, 1,4-dilithio-2-methyl - 2-butene, 1,4-dilithio-2-butene, 1,4-dipotassio-2- butene, dilithionaphthalene, disodionaphthalene, 4,4'-dilithiobiphenyl, disodiophenanthrene, dilithioanthracene, 1,2-dilithio-1,1-diphenylethane, 1,2-disodio-1,2,3 - triphenylpropane, 1,2-dilithio-1,2-diphenylethane, 1,2-dipotassiotriphenylethane, 1,2-dilithiotetraphenylethane, 1,2-dilithio-1-phenyl-1-naphthylethane, 1,2-dilithio-1,2-dinaphthylethane, 1,2-disodio-1,1-diphenyl-2-naphthylethane, 1,2-dilithiotrinaphthylethane, 1,4-dilithiocyclohexane, 2,4-disodioethylcyclohexane, 3,5-dipotassio-n-butylcyclohexane, 1,3,5-trilithiocyclohexane, 1-lithio-4-(2-lithiomethylphenyl)butane, 1,2 - dipotassio-3-phenylpropane, 1,2-di(lithiobutyl)benzene, 1,3-dilithio-4-ethylbenzene, 1,4-dirubidiobutane, 1,8-dicesiooctane, 1,5,12-trilithiododecane, 1,4,7-trisodioheptane, 1,4 - di(1,2 - dilithio-2-phenylethyl)benzene, 1,2,7,8-tetrasodionaphthalene, 1,4,7,10-tetrapotassiodecane, 1,5-dilithio-3-pentyne, 1,8-disodio-5-octyne, 1,7-dipotassio-4-heptyne, 1,10-dicesio-4-decyne, 1,11-dirubidio-5-hendecyne, 1,2-disodio-1,2-diphenylethane, dilithiophenanthrene, 1,2-dilithiotriphenylethane, 1,2-disodio-1,2-diphenylethane, dilithiomethane, 1,4-dilithio-1,1,4,4-tetraphenylbutane, 1,4 - dilithio - 1,4 - dihenyl-1,4-dinaphthylbutane and the like.

Certain specific initiators give better results than others and are preferred in carrying out preparation of the terminally reactive polymers. Lithium adducts of naphthalene, methylnaphthalenes, and anthracene give very good results. A preferred initiator is 1,2-dilithio-1,2-diphenylethane (lithium-stilbene adduct). An initiator which is preferred for the formation of semi-telechelic polymers is n-butyllithium. Other preferred initiators for the formation of telechelic polymers are the dilithium adducts of 2,3-dialkyl-1,3-butadiene, e.g., 2,3-dimethyl-1,3-butadiene, and especially the dilithium adducts of isoprene and 1,3-butadiene wherein the adduct contains from 1 to 7 diene units per molecule.

The amount of initiator which can be used will vary depending on the polymer prepared, and particularly the molecular weight desired. Usually the terminally reactive polymers are liquids, having molecular weights in the range of 1000 to about 20,000. However, depending on the monomers employed in the preparation of the polymers and the amount of initiator used, semi-solid and solid terminally reactive polymers can be prepared having molecular weights up to 150,000 and higher. Usually the initiator is used in amounts between about 0.25 and about 100 millimoles per 100 grams of monomer.

Formation of the terminally reactive polymers is generally carried out in the range of between —100 and +150° C., preferably between —75 and +75° C. The particular temperature employed will depend on both the monomers and the initiators used in preparing the polymers. For example, it has been found that the organolithium initiators provide more favorable results at elevated temperatures whereas lower temperatures are required to effectively initiate polymerization to the desired products with the other alkali metal compounds. The amount of catalyst employed can vary but is preferably in the range of between about 1 and about 30 millimoles per 100 grams of monomers. It is preferred that the polymerization be carried out in the presence of a suitable diluent which is predominantly hydrogen, such as benzene, toluene, cyclohexane, methylcyclohexane, xylene, n-butane, n-hexane, n-heptane, isooctane, and the like. Generally, the diluent is selected from hydrocarbons, e.g. paraffins, cycloparaffins, and aromatics containing from 4 to 10 carbon atoms per molecule. It should be understood that relatively small amounts of other materials can be present, such as the ethers in which the initiator was dissolved, or a polar compound which is charged to encourage random copolymerization. As stated previously, the organodilithium compounds are preferred as initiators in the polymerization reaction since a very large percentage of the polymer molecules formed contain two terminal reactive groups, and also the polymerization can be carried out at normal room temperatures. This is not to say, however, that other organo alkali metal initiators cannot be employed; however, usually more specialized operation or treatment is required with these materials, including low reaction temperatures.

The polymer chains resulting from the above described process are terminated with one or more alkali metal atoms, preferably lithium atoms, depending upon the initiator employed. Without terminating the polymerization mixture or treating it in any way to remove the alkali metal atoms from the polymer, the polymer is then treated with a silicon halide or silicon ester or analogous material to give a product which contains reactive silicon-containing terminal groups. For example, the polymer containing the terminal alkali metal atoms is treated with an orthosilicate or a silicon tetrahalide. The reaction occurs between the alkali metal on the polymer and the silicon halide or ester to remove the alkali metal atom and substitute therefor a silicon-containing residue which still carries at least one reactive group.

The silicic compounds which can be employed in our invention to place silicon-containing end groups on the polymer molecules prepared over an organo alkali metal catalyst include the silicon tetrahalides such as silicon tetrachloride, silicon tetrabromide, and silicon tetraiodide, silanes and siloxanes, both the open chain and cyclic siloxanes. The silanes contain one silicon atom per molecule and the open chain siloxanes contain 2 to 12 silicon atoms per molecule while the cyclic siloxanes have 3 to 6 silicon atoms per molecule. The silicon tetrahalides and silanes can be represented by the formula $R_nSiX_{4-n}$, wherein R is hydrogen or an alkyl, cycloalkyl, aryl, alkaryl, or aralkyl radical containing from 1 to 20 carbon atoms, X is halogen or YR wherein Y is O, NR or S, with R being of the same scope as hereinbefore defined; and $n$ is an integer from 0 to 2. It can be seen from this description that the silanes must contain at least 2 of the groups consisting of halogen, OR, $NR_2$ or SR. The silicon tetrahalides, of course, contain 4 halogen atoms attached to the silicon. One of these reactive groups is employed in the reaction with the alkali metal-containing polymer and the remaining reactive group enables the silicon-containing polymer to be coupled and/or cured by reaction with other suitable reagents.

The open chain siloxanes can be represented by the formula

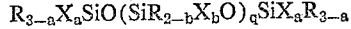

wherein R and X are as above described, $a$ is an integer from 0 to 3, $b$ is an integer from 0 to 2, the sum of the $a$'s and $b$'s is at least 2, and $q$ is an integer from 0 to 10.

Cyclic siloxanes can be represented by the formula

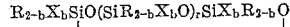

wherein R, X, and $b$ are as above described, the sum of the $b$'s is at least 2, and $r$ is an integer from 1 to 4. It can be seen from the above formulas that the siloxanes, both the open chain and the cyclic compounds also contain at least 2 of the reactive substituents, halogen, OR, $NR_2$ or SR for the same reason as discussed above in connection with the silanes.

Examples of the various types of silicic compounds, in addition to silicon tetrahalides, include the following:

trifluorosilane,
dichlorosilane,
trichlorosilane,
dibromosilane,
triiodosilane,
difluoro(dimethyl)silane,
trifluoro(isopropyl)silane,
trichloro(ethyl)silane,
trichloro(nonyl)silane,
tribromo(decyl)silane,
diodo(didodecyl)silane, trichloro(eicosyl)silane,
dibromo(dicyclohexyl)silane,
difluoro(dicyclopentyl)silane,
trichloro(methylcyclohexyl)silane,
dichloro(diphenyl)silane,
tribromo(benzyl)silane,
trichloro(4-tolyl)silane,
dichloro(dibenzyl)silane,
ethyl(trimethoxy)silane,
phenyl(tri-n-butoxy)silane,
dicyclohexyl(diphenoxy)silane,
dieicosyl(dibenzoxy)silane,
didecyl(didecoxy)silane,
tetraethoxysilane (ethyl orthosilicate),
tetradodecoxysilane (dodecyl orthosilicate),
tetraphenoxysilane (phenyl orthosilicate),
dibutoxy-di(tetradecoxy)silane,
methyl-tri(methylmercapto)silane,
nonyl-tri(nonylmercapto)silane,
phenyl-tri(phenylmercapto)silane,
eicosyl-tri(eicosylmercapto)silane,
tetra(methylamino)silane,
tetra(nonylamino)silane,
tetra(tridecylamino)silane,
methyl-tri(methylamino)silane,
dioctyl-di(octylamino)silane,
di(pentadecyl)-di(ethylamino)silane,
ethyl[tri(methyl-n-propylamino)]silane,
dibenzyl-di(benzylamino)silane,
diphenyl-di(dieicosylamino)silane,
cyclohexyl-tri(dicyclohexylamino)silane,
chloro(heptyl)(dihexoxy)silane,
dibromo-di(4-tolylmercapto)silane,
dichloro-di[di(dodecylamino)]silane,
hexamethoxydisiloxane,
hexaethoxydisiloxane,
sym-tetradecoxydisiloxane,
1,3-dichloro-5-butyltrisiloxane,
(1,1,1,7,7,7-hexachloro-3,5-diethyl)tetrasiloxane,
[1,1,5,5,9,9-hexa(ethoxy)1,9-diethyl]pentasiloxane,
1,1,15,15-tetra(eicosoxy)octasiloxane,
(1,1,19,19-tetrabromo-3,7,9,11-tetramethyl)decasiloxane,
1,1,1,23,23,23-hexa(butylamino)dodecasiloxane,
1,1,1-tri(phenylmercapto)hexasiloxane,
3,5-dichlorotetrasiloxane,
1,3,5-tri(benzoxy)trisiloxane,
1,3,5,7-tri(cyclohexoxy)tetrasiloxane,
hexamethoxycyclotrisiloxane,
hexachlorocyclotrisiloxane,
octabromocyclotetrasiloxane,
1,3,5-tri(dimethylamino)cyclotrisiloxane,
[1,1,5,5-tetra(hexylmercapto)-3,3,7,7-tetramethyl]cyclotetrasiloxane,
1,1,5,5,9,9-hexachlorocyclohexasiloxane and the like. Of the above materials, the silicon tetrahalide and the orthosilicates are preferred and the esters are preferred over the halides because the terminal groups are less reactive than those containing the silicon to halogen bonds and the products are, therefore, more readily isolated.

When contacting lithium-containing polymers with the silicic compound it is preferred to add the polymer solution to the treating agent, particularly when the polymer is one of high molecular weight. This method of operation minimizes gelation. With lower molecular weight polymers, the treating agent can be added to the polymer solution if desired.

The amount of silicic treating agent employed will be dependent upon the number of organolithium bonds on each polymer chain and on the type of product desired. For example, polymer made by initiation with an alkylmonolithium compound could be treated with excess silicon tetrachloride so that the product would be polymer chains of which one end is terminated with —SiCl$_3$ without significant increase in molecular weight. On the other hand, a lesser amount of silicon halide could be used so that two or more polymer chains would be coupled to a single silicon atom to form a new polymer molecule of increased molecular weight. In general, the amount of silicon-containing treating agent will be in the range from 0.5 to 20 moles of silicon compound per gram atom of lithium present in the polymer. The treating temperature can vary but will generally be in the range from 0 to 175° F.

The resulting product which is a polymer that contains silicon-containing reactive end groups is then subject to a number of useful reactions to produce a variety of products. It is significant that when a conjugated diene polymer is employed in the preparation of this product all of the unsaturation originally incorporated into the polymer is still present after addition of the silicon-containing groups. The reason for this is that silicon compounds are caused to react with the alkali metal atoms which are terminally positioned on the polymer as a result of the method of polymerization. As pointed out above, the addition of the silicic compounds can result in two or more polymer chains being joined to form a new polymer of increased molecular weight. If a polyalkali metal initiator has been employed, this polymer of increased molecular weight will likewise have silicon-containing reactive groups positioned terminally on the new molecule. If a monoalkali metal initiator such as n-butyllithium has been employed for the polymerization to produce a semi-telechelic polymer, the resulting product will be a mixture of polymer containing a single terminally positioned silicon-containing group and coupled polymer which consists of two of the original polymer molecules joined by a silicon-containing connecting link. While such a polymer can be recovered as an end product it is preferred in such an instance to employ silicic compounds which contain at least 3 reactive groups as before defined so that the resulting coupled polymer will have a reactive substituent remaining at the point of coupling which can then be used to cross-link the polymer at the point of coupling with other polymer molecules.

The silicon-containing polymer can be treated with a reagent to produce coupling while the polymer is in solution or the polymer can be separated from solution and treated in the absence of a diluent. For example, the polymer can be recovered by coagulation either through the addition of an alcohol or by flashing the solvent. It is preferred that when an alcohol is added there be incorporated in the alcohol an amount of acid approximately equal to the amount of base which is generated as a result of the lithium present in the system. For example, when ethyl orthosilicate is reacted with a lithium telechelic polymer, lithium alcoholate is produced as a by-product if the system is anhydrous and if water is present in small amounts, lithium hydroxide is formed. If this base is not neutralized the presence of the base will tend to cause gelation while the polymer is being dried. While it is not essential that this procedure be followed, it is preferred if polymer is recovered for subsequent compounding and curing.

A variety of materials can be employed to cause the thus formed silicon containing polymers to couple and/or cure with other polymer molecules in the mixture. For example, polyalkali metal organic compounds of the same type as employed in the initiation of the polymerization, except having at least two alkali metal atoms per molecule can be employed as coupling agents. In this case the alkali metal atoms of the polyalkali metal organic compound react with the reactive groups on the silicon atoms connected to the polymer in the same manner as the silicic compound originally reacted with polymer containing the terminal alkali metal atom. This reaction is analogous to the coupling which is described in connection with the silicic compounds and the alkali metal-telechelic polymers with the major difference being in the much lower molecular weight of the polyalkali metal organic compound which permits a considerably higher molar concentration of this coupling agent and therefore a more pronounced reaction between the coupling agent and the polymers terminated with silicon-containing groups.

The silicon-telechelic polymers or semi-telechelic polymers can be coupled or cured with compounds which contain two or more active hydrogen atoms, that is, hydrogen which is joined to oxygen, nitrogen or sulfur. Examples of such active hydrogen-containing reagents include water, ammonia, hydrogen sulfide, polyhydroxy compounds such as glycerol and glycols, for example, ethylene glycol, propylene glycol and triethylene glycol; polyhydroxy aromatic compounds such as catechol, resorcinol, hydroquinone and pyrogallol; polyamines such as phenylenediamine, triethylenetetramine, tetraethylenepentamine and the like. Generally the molecular weight of these coupling agents does not exceed that described for the polymerization initiators which, as previously discussed, can also be used as coupling agents.

The polymers which have silicon-containing reactive end groups carrying the substituents OR, $NR_2$ or SR can also be coupled by treating them with acidic materials such as hydrochloric acid, phosphoric acid, phenylsulfonic acid, chloroacetic acid, trichloroacetic acid and the like. In this regard both the monobasic and polybasic organic acids can be employed including such polybasic acids as succinic acid, glutaric acid, adipic acid, azelaic acid phthalic acid and terephthalic acid. It will be recognized that these polybasic organic acids are included in the compounds described as those containing two or more active hydrogen groups joined to an oxygen atom. Even so it is believed that in this instance these polybasic organic acids function in the same manner as do the monobasic acids rather than as coupling agents.

While we do not intend for our invention to be limited to theory it is believed that the acids react with the polymers having silicon-containing reactive groups wherein the silicon substituent that is reactive is selected from OR, $NR_2$ or SR as previously defined in order to convert this group to OH, $NH_2$ or SH respectively. Two polymer molecules having their reactive end groups thus converted can then undergo condensation reactions in which either water, ammonia or hydrogen sulfide is split out. This water or ammonia or hydrogen sulfide can then serve as coupling agents for other polymer molecules. Whatever the reaction involved it has been found that monobasic acids can be employed to produce coupling and/or curing of the polymers containing the silicon esters or analogous materials employing nitrogen or sulfur in place of the oxygen. In instances where the reactive constituent on the silicon of the telechelic or semi-telechelic polymer is already OH, $NH_2$ or SH the presence of the acidic material appears to further the condensation reaction between the polymer molecules. When the reactive substituent on the silicon is halogen, the monobasic acids such as acetic, propionic and the like do not serve as coupling agents but instead terminate the polymer with the acid residue after splitting out a halogen acid. The polybasic acids in this case appear to function as coupling agents and therefore can be employed effectively to couple or cure any of the silico-telechelic or silico-semi-telechelic polymers described.

Water is the preferred coupling agent in the practice of our invention and when water is employed, basic compounds such as the alkali metal hydroxides further the coupling or curing reaction. When water, hydrogen sulfide or ammonia is employed as the coupling or cross-linking reagent with the silicon-containing polymers, a large excess of the reagent can be used. This is especially true when water is employed. Too large an excess of the other coupling agents described tends to terminate the reaction and therefore minimize coupling or cross-linking. With such other coupling agents it is preferred that a stoichiometric amount be used although 80 to 90 percent of stoichiometric can be employed with good results. Preferably the amount used, however, ranges from stoichiometric to about 30 percent in excess of stoichiometric amounts.

Since polyhydroxy compounds can be employed as coupling agents, the silicon-containing polymer of our invention can be used to cross-link with hydroxy telechelic polymers. In this case the reactive end groups are coupled after the polymers have been compounded preferably with an auxiliary curative such as sulfur or dicumyl peroxide. In a similar manner, polymers of the polyethylene oxide type, polyvinylalcohol, cellulose or polyacrylates can be combined with the silicon-containing telechelic or semi-telechelic polymers of our invention.

The curing or coupling can be effected while the polymer is in solution or the polymer can be recovered and then compounded with the coupling or curing agent either alone or with conventional curatives such as sulfur, dicumyl peroxide or polyisocyanates. In such a case the amount of conventional curative will normally be in the range of from 0.05 to 5 parts per hundred parts of polymer, and preferably about 0.1 to 3 parts per 100 parts by weight of polymer are used.

The temperature at which the curing or coupling is carried out can vary over a relatively wide range, for example from 60° F. or lower to 450° F. At the lower temperatures ordinarily a much longer time is required to effect a given degree of coupling or curing. Preferably the temperatures are in the range of 100 to 400° F. The temperatures above 100° F. are especially preferred for the polymers of the type which contain active groups selected from OR, $NR_2$ and SR attached to the silicon atoms as previously defined. The time for the reaction is dependent upon temperature and the materials employed, and can range anywhere from about 5 minutes up to 100 hours or more.

Our invention provides a method whereby liquid polymers can be cross-linked or cured to provide solid polymeric products. Such polymers are useful in making molded objects and they can also be used as binders for solid materials. Rubber having excellent properties can be obtained by using a combination of curatives which will produce cross-linking along polymer chains as well as coupling at the ends of the polymer according to the reaction as described above. Improvements in several physical properties, for example in modulus and tensile strength, heat build-up and resilience have been noted when rubbers are compounded and cured according to our invention in contrast to similar rubbers which do not have the reactive silicon-containing terminal groups. These products are useful in tread stocks. Other materials of our invention have utility in adhesives, coatings, gasket stocks, and the like. The advantages of our invention will be more apparent from the following examples. The specific conditions and materials used in these examples are presented as being typical and should not be construed to limit our invention unduly.

*Example I*

Butadiene was polymerized in accordance with the following recipes:

|  | Parts by Weight | |
| --- | --- | --- |
|  | 1 | 2 |
| 1,3-Butadiene | 100 | 100 |
| Cyclohexane | 780 | 780 |
| 1,2-Dilithio-1,2-diphenylethane | [1] 2.91 | [2] 4.85 |
| Temperature, ° F | 122 | 122 |
| Time, hours | 1 | 1 |

[1] Fifteen millimoles per 100 parts monomers.
[2] Twenty-five millimoles per 100 parts monomers.

Polymerization grade cyclohexane was employed. It was dried by counter-current purging with nitrogen.

Butadiene (special purity) was flash distilled, condensed at Dry Ice temperature, and decanted into bottles. The 1,2-dilithio-1,2-diphenylethane was prepared as 0.1–0.2 molar solution in ethyl ether (9 volumes) and tetrahydrofuran (1 volume). Polymerizations were conducted in beverage bottles. The solvent was added and the bottles purged with prepurified nitrogen at 3 liters per minute for 5 minutes. The bottles were capped after which butadiene and the organolithium compound were charged, in that order, by syringe. Conversion in each case was essentially quantitative. Portions of the unquenched polymerization mixtures were terminated by reaction with isopropyl alcohol to provide samples of the parent liquid polybutadiene. Silicon tetrachloride was added slowly to each of the remaining polymer solutions, using a 1:1 mole ratio of $PLi_2:SiCl_4$ ($PLi_2$=polymer with terminal lithium atoms), and the mixtures were then allowed to stand one hour at room temperature. The solutions became viscous. The product expected in each case was $(-P-SiCl_2-P-SiCl_2)_n$. Portions of the resultant solutions were added to aqueous sodium hydroxide. Results were as follows:

| Product from Recipe | Reactant | Inh. Visc.³ | Gel, Percent | Type of Product |
|---|---|---|---|---|
| 1¹ | | 0.34 | 0 | Liquid polymer. |
| 1² | Aqueous NaOH | | 91 | Silicic polymer. |
| 2¹ | | 0.23 | 0 | Liquid polymer. |
| 2² | Aqueous NaOH | | 84 | Silicic polymer.³ |

¹ Parent polybutadiene.
² $SiCl_4$-treated polymer.
³ Determined on samples which had been coagulated in isopropyl alcohol and dried.

The above data demonstrate that the polymer containing terminal silicon to which chlorine is attached can be cross-linked to a high degree with water. The amount of gel formed in each case indicates that some cross-linking along the polymer chain as well as at the polymer ends occurred, supporting the conclusion that some coupling occurred as a result of the reaction between the lithium telechelic polymer and the silicon tetrachloride. The higher molar concentration of initiator produced a polymer of lower inherent viscosity but both polymers were highly coupled and cross-linked with the addition of water containing NaOH to produce substantial amounts of gel.

*Example II*

The following recipe was employed for the polymerization of butadiene:

| | Parts by Weight |
|---|---|
| 1,3-Butadiene | 1100 |
| Toluene | 1300 |
| 1,2-Dilithio-1,2-diphenylethane (5.0 mmoles) | 0.97 |
| Temperature, °F. | 122 |
| Time, hours | 2 |

The procedure followed was the same as that described in Example I. The toluene was dried by countercurrent purging with nitrogen. Quantitative conversion was obtained in the two-hour polymerization period. A portion of the reaction mixture was terminated with isopropyl alcohol to provide a sample of the parent polybutadiene for comparative purposes. It was an extremely sticky polymer which was gel free and had an inherent viscosity of 0.82. The remainder was added slowly to an excess of 0.30 molar $SiCl_4$ and the reaction mixture was allowed to stand one hour at 122° F. The solution became viscous. The mole ratio of $PLi_2:SiCl_4$ was 1:21. The product was believed to be $Cl_3Si-P-SiCl_3$, where P denotes the polymer chain.

The $SiCl_4$-treated polymer solution was reacted with water, ethylene glycol, and tetraethylenepentamine. The temperature of each mixture was held at 122° F. for one hour following addition of the treating agent. Results were as follows:

| Reactant | Inherent Viscosity² | Gel, Percent | Swelling Index |
|---|---|---|---|
| None¹ | 0.82 | 0 | |
| Water | ³0.64 | 70 | 20 |
| Ethylene glycol | ³0.90 | 86 | 18 |
| Tetraethylenepentamine | ³1.25 | 51 | 30 |

¹ Parent polymer prior to $SiCl_4$ treatment.
² Determined on samples which had been coagulated in isopropyl alcohol and dried.
³ Determined on the soluble portion of the polymer.

The data show that a gel free solution of $SiCl_4$-treated polymer was obtained by adding $PLi_2$ solution slowly to a large excess of $SiCl_4$. Treatment of this soluble reaction product with water at 122° F. resulted in a cross-linked, silicic polymer. Crosslinked products also resulted when ethylene glycol and tetraethylenepentamine were used as treating agents.

*Example III*

The following recipe was used for the polymerization of butadiene:

| | Parts by Weight |
|---|---|
| 1,3-Butadiene | 100 |
| Toluene | 867 |
| n-Butyllithium (4.0 mmoles) | 0.26 |
| Temperature, °F. | 122 |
| Time, hours | 5 |

The polymerization procedure was the same as used in the preceding examples. A portion of the unquenched polymer solution was withdrawn and terminated with isopropyl alcohol to provide a sample of the parent polymer for comparative purposes. Ethyl orthosilicate, previously purified by distillation, was dissolved in cyclohexane to make a 0.25 molar solution. This solution was added to the remainder of the unquenched polymer solution and the mixture was agitated for 16 hours at 122° F. The mole ratio of $PLi:Si(OEt)_4$ was 0.98:1. The product expected as a result of this reaction is triethoxysilylpolybutadiene, $P-Si(OEt)_3$. It was treated with aqueous NaOH and dilithiobutane, and in each case the mixture was agitated for 16 hours at 122° F. Results were as follows:

| Polymer Used | Coupling Agent | Inherent Viscosity¹ | Gel, Percent |
|---|---|---|---|
| Parent polybutadiene | | 0.68 | 0 |
| $P-Si(OEt)_3$ | | 0.88 | 0 |
| $P-Si(OEt)_3$ | Aqueous NaOH | 1.16 | 0 |
| $P-Si(OEt)_3$ | Dilithiobutane | 1.98 | 0 |

¹ Determined on products which are isolated by isopropyl alcohol coagulation and vacuum dried.

The increase in inherent viscosity upon treatment of the lithium-containing polymer with ethyl orthosilicate indicates that some coupling occurred. Additional coupling resulted upon further treatment with aqueous NaOH and dilithiobutane. It should be noted that the use of n-butyllithium initiator produced semi-telechelic polymer.

*Example IV*

The following recipe was used for the polymerization of butadiene:

| | Parts by Weight |
|---|---|
| 1,3-Butadiene | 100 |
| Cyclohexane | 780 |
| 1,2-Dilithio-1,2-diphenylethane (6.0 mmoles) | 1.2 |
| Temperature, °F. | 122 |
| Time, hours | 2 |

Polymerization was effected as in the preceding examples. The unquenched reaction mixture was divided into three portions. Isopropyl alcohol was added to the first portion, isopropyl alcohol followed by ethyl orthosilicate to the second, and ethyl orthosilicate to the third. Each mixture was maintained at a temperature of 122° F. for 24 hours. The samples were reprecipitated from cyclohexane solution three times by the addition of isopropyl alcohol and were vacuum dried. They were then subjected to infrared examination in order to obtain evidence for the presence of the triethoxysilyl group, $(EtO)_3Si$. The following table gives a summary of the treatment of each portion of the unquenched polymer solution and the results obtained:

|  | 1 | 2 | 3 |
|---|---|---|---|
| Unquenched polymer, $PLi_2$, parts by weight | 100 | 100 | 100. |
| Isopropyl alcohol | 3 [1] | 3 [1] |  |
| Ethyl orthosilicate |  | 25 [2] | 25.[2] |
| Temperature, °F | 122 | 122 | 122. |
| Time, hours | 24 | 24 | 24. |
| Expected product | Parent PBD [3] | Parent PBD [3] | ([4]) |
| Inherent viscosity | 0.55 | 0.57 | 0.82.[5] |
| Gel, percent | 0 | 0 | 16. |
| Infrared absorption due to Si-O-C [6] | None | None | Definite. |

[1] Fifty millimoles per 100 grams monomer.
[2] One hundred millimoles per 100 grams monomers.
[3] Polybutadiene.
[4] Polybutadiene containing triethoxysilyl terminal groups.
[5] Some coupling occurred.
[6] Measurement by differential infrared, i.e., comparison of 1 with 2 and 1 with 3.

The forgoing results show that treatment of the unquenched polymer solution, $PLi_2$, with ethyl orthosilicate gave a product containing terminal triethoxysilyl groups.

*Example V*

A liquid polymer of butadiene was prepared in accordance with the following recipe and a portion was then treated with ethyl orthosilicate:

Polymerization: Parts by weight
    1,3-Butadiene _____ 100
    Toluene _____ 1300
    1,2-Dilithio-1,2-diphenylethane (30 mmoles) _ 5.8
    Temperature, °F. _____ 122
    Time, hours _____ 1.5
Reaction with $Si(OEt)_4$:
    Unquenched polymer solution, $PLi_2$ _____ 100
    Ethyl orthosilicate _____ 62
    Temperature, °F. _____ 122
    Time, hours _____ 17

The polymerization reaction reached quantitative conversion in the time allowed. Both the ethyl orthosilicate treated and the untreated portions of the polymer solution were coagulated by adding approximately 5 volumes of isopropyl alcohol to one volume of the polymerization mixture. The addition of the isopropyl alcohol caused the polymer layer to separate and the bulk of the solvent was thus removed from the polymer. Sixty millimoles of concentrated HCl had been added to the isopropyl alcohol per 100 grams of monomer. The HCl added was, therefore, just sufficient to react with all of the lithium present and render the system neutral thereby avoiding gelation of the polymer during drying. The polymers were then dried in a vacuum oven.

Various crosslinking agents were added to the parent polybutadiene and the ethyl orthosilicate-treated polymer and the compositions were cured 28 hours at 150° F. followed by 36 hours at 220° F. Inherent viscosity and gel determinations were made on each of the products. Results were as follows:

| Crosslinking Agent | | $Si(OEt)_4$-treated Polymer | | Untreated Polymer | |
|---|---|---|---|---|---|
| Type | Parts [1] | Inh. Visc.[2] | Gel, percent | Inh. Visc. | Gel, percent |
| Trichloroacetic acid | 1.0 | 0.37 | 78 | 0.15 | 0 |
| Trimethylene glycol | 10 | 0.25 | 36 | 0.14 | 0 |
| Tetraethylenepentamine | 1.0 | 0.66 | 26 | 0.16 | 0 |
| None |  | 0.16 | 0 | 0.16 | 0 |

[1] Parts by weight per 100 parts polymer.
[2] Determined as soluble portion.

These data show that the ethyl orthosilicate-treated polymer was crosslinked by reaction with trichloroacetic acid, trimethylene glycol, and tetraethylenepentamine as evidenced by the gel content of the product. The increase in inherent viscosity of the soluble portion also indicates that coupling occurred. There was no evidence of either coupling or crosslinking when the parent polymer was treated with the crosslinking agents as can be seen by inherent viscosity and gel data.

*Example VI*

The liquid polybutadiene containing terminal triethoxysilyl groups, prepared as described in Example V, was milled with two fillers, Philblack O (high abrasion furnace black) and Hi-Sil 233 (hydrated silica pigment of extremely fine particle size) along with monochloroacetic acid. The stocks were cured 30 minutes at 307° F. and physical properties determined. Results were as follows:

| Filler 50 Parts [1] | $ClCH_2COOH$, parts | Tensile, p.s.i. | Elongation, percent | $V_r$ [2] |
|---|---|---|---|---|
| Philblack O | 5 | 400 | 100 | 0.256 |
| Hi-Sil 233 | 5 | 280 | 60 | 0.373 |

[1] Parts by weight per 100 parts polymer.
[2] Volume fraction of polymer in the swollen stock determined according to the method described in Rubber World, 135, No. 1, 67–73 (1956). This is an indication of the degree of cross-linking in the polymer.

The parent liquid polybutadiene which had not been treated with ethyl orthosilicate did not cure when compounded and heated in the same manner as the above compositions. Curing of the above compositions occurred by reaction with the triethoxysilyl groups.

*Example VII*

A butadiene/styrene rubber was prepared in accordance with the following formulation and a portion was then treated with ethyl orthosilicate:

Polymerization Parts by weight
    1,3-Butadiene _____ 77
    Styrene _____ 23
    Cyclohexane _____ 1170

| Polymerization—Continued | Parts by weight |
|---|---|
| 1,2-Dilithio-1,2-diphenylethane (1.4 mmoles) | 0.27 |
| Temperature, °F | 122 |
| Time, hours | 3 |
| Reaction with (EtO)$_4$Si | |
| Unquenched polymer solution, PLi$_2$ | 100 |
| Ethyl orthosilicate (28 mmoles) | 5.8 |
| Temperature, °F | 122 |
| Time, hours | 22 |

The polymerization reached quantitative conversion in the time allowed. The ethyl orthosilicate-treated polymer was recovered by adding 2.8 millimoles per 100 grams polymer of 0.6 molar HCl in isopropyl alcohol and then coagulating it with isopropyl alcohol. The parent untreated polymer was coagulated with isopropyl alcohol. Both products were vacuum dried. Properties were as follows:

| Polymer | Inh. Visc. | Gel, percent | ML-4 at 212° F. | Ash, Wt. percent |
|---|---|---|---|---|
| Parent copolymer | 1.46 | 0 | 34 | 0.15 |
| Si(OEt)$_4$-treated copolymer | 1.70 | 0 | 36 | 0.13 |

The parent copolymer and the Si(OEt)$_4$-treated copolymer were each compounded in a recipe using 50 phr. (phr.=parts by weight per 100 parts rubber) Philback 0 and 0.5 phr. Di-Cup 40° C. (40 percent active dicumyl peroxide and 60 percent precipitated CaCO$_3$). Variable amounts of monochloroacetic acid were added to this recipe. The stocks were cured 30 minutes at 307° F. and physical properties determined. Results were as follows:

Si(OEt)$_4$-TREATED COPOLYMER

| Chloracetic Acid, phr. | $V_r$[1] | 300% Modulus, p.s.i. | Tensile, p.s.i. | Elongation, Percent | Shore Hardness | ΔT, °F. | Resilience, Percent |
|---|---|---|---|---|---|---|---|
| 0 | 0.310 | 860 | 1,710 | 560 | 65 | 118.9 | 61.8 |
| 0.5 | 0.393 | 1,500 | 2,770 | 500 | 68 | 70.9 | 69.0 |
| 1 | 0.370 | 1,370 | 3,150 | 600 | 68 | 55.1 | 75.0 |
| 2 | 0.406 | 1,600 | 3,210 | 570 | 75 | 61.2 | 72.4 |

PARENT COPOLYMER

| | | | | | | | |
|---|---|---|---|---|---|---|---|
| 0 | 0.276 | 590 | 1,270 | 630 | 67 | 171 | 60.4 |
| 0.5 | 0.275 | 580 | 1,150 | 600 | 66 | 131 | 61.7 |
| 1 | 0.245 | 440 | 760 | 580 | 66 | 145 | 60.5 |
| 2 | 0.248 | 450 | 800 | 560 | 67 | 146 | 60.8 |

[1] Parts by weight per 100 parts polymer.

The above data demonstrate that the lithium telechelic copolymer when treated with ethyl orthosilicate and subsequently compounded and cured in the presence of chloroacetic acid produces a polymer which has outstanding properties in tensile strength and heat build-up. It is shown that the parent copolymer, although having substantially the same Mooney value in the uncured state, when compounded and cured with dicumyl peroxide in the same recipe did not provide a polymer having properties as desirable as those of the product of our invention. The addition of the chloroacetic acid to the parent copolymer appeared to have a deleterious effect upon the tensile strength of the cured polymer whereas the tensile strength of the product of our invention was substantially improved with the addition of the chloroacetic acid.

It will be apparent to those skilled in the art from the above disclosure that various modifications and variations can be made in our invention without departing from the spirit or scope thereof.

We claim:

1. A process for making a polymeric product which comprises reacting a polymer which is a polymerizate of a vinylidene-containing monomer and contains at least one terminal alkali metal atom per molecule with a silicic compound selected from the group consisting of compounds having 1 silicon atom per molecule, open chain siloxanes having 2 to 12 silicon atoms per molecule, and cyclic siloxanes having 3 to 6 silicon atoms per molecule, said silicic compound containing at least two substituents per molecule selected from the group consisting of halogen, OR, NR$_2$, and SR attached to said silicon atoms with the remaining valences of said silicon atoms attached to an R radical wherein each R is selected from the group consisting of hydrogen, alkyl, cycloalkyl, aryl, aralkyl, and alkaryl radicals containing up to 20 carbon atoms.

2. The process of claim 1 wherein said vinylidene-containing monomer is a conjugated diene containing from 4 to 12 carbon atoms per molecule and said alkali metal is lithium.

3. A process for making a polymeric product which comprises reacting a polymer containing at least one terminal lithium atom per molecule and selected from the group consisting of homopolymers of conjugated dienes containing 4 to 12 carbon atoms per molecule and copolymers of said conjugated dienes with copolymerizable monomers containing a CH$_2$=C< group with a silicic compound selected from the group consisting of compounds having 1 silicon atom per molecule, open chain siloxanes having 2 to 12 silicon atoms per molecule, and cyclic siloxanes having 3 to 6 silicon atoms per molecule, said silicic compound containing at least two substituents per molecule selected from the group consisting of halogen, OR, NR$_2$, and SR attached to said silicon atoms with the remaining valences of said silicon atoms attached to an R radical wherein each R is selected from the group consisting of hydrogen, alkyl, cycloalkyl, aryl, aralkyl, and alkaryl radicals containing up to 20 carbon atoms.

4. The process of claim 3 wherein said polymer is a polymer of butadiene and contains two terminal lithium atoms per molecule.

5. The process of claim 3 wherein said polymer is a copolymer of butadiene and styrene and contains two terminal lithium atoms per molecule.

6. A process for making a polymeric product which comprises reacting a polymer containing at least one terminal lithium atom per molecule and selected from the group consisting of homopolymers of conjugated dienes containing 4 to 12 carbon atoms per molecule and copolymers of said conjugated dienes with copolymerizable monomers containing a CH$_2$=C< group with a silicic compound selected from the group consisting of compounds having 1 silicon atom per molecule, open chain siloxanes having 2 to 12 silicon atoms per molecule, and cyclic siloxanes having 3 to 6 silicon atoms per molecule, said silicic compound containing at least two substituents per molecule selected from the group consisting of halogen, OR, NR$_2$, and SR attached to said silicon atoms with the remaining valences of said silicon atoms attached to an R radical wherein each R is selected from the group consisting of hydrogen, alkyl, cycloalkyl, aryl, aralkyl, and alkaryl radicals containing up to 20 carbon atoms and reacting the resulting polymer with a reagent selected from the group consisting of polyalkali metal organic compounds containing 1 to 20 carbon atoms per molecule, compounds containing at least 2 hydrogen atoms per molecule joined to atoms selected from the group consisting of O, N and S and, when said substituents attached to said silicon atoms of said silicic compound are other than halogen, monobasic acids.

7. The process of claim 6 wherein said polymer is polybutadiene, said silicic compound is silicon tetrachloride, and said reagent is water.

8. The process of claim 6 wherein said polymer is polybutadiene, said silicic compound is silicon tetrachloride and said reagent ethylene glycol.

9. The process of claim 6 wherein said polymer is polybutadiene, said silicic compound is silicon tetrachloride and said reagent is tetraethylenepentamine.

10. The process of claim 6 wherein from 0.5 to 20 mols of said silicic compound are used per gram atom of lithium in the original polymer and said reagent is used in at least stochiometric proportions to the reactive group in said resulting polymer.

11. The process of claim 6 wherein said polymer containing lithium and said silicic compound are reacted at a temperature in the range of 0 to 175° F. by adding a solution of said polymer to said silicic compound.

12. A process for making a polymeric product which comprises contacting a vinylidene-containing monomer with a polymerization initiator having the formula $R'M_x$ wherein $R'$ is a hydrocarbon radical selected from the group consisting of aliphatic, cycloaliphatic and aromatic radicals containing 1 to 20 carbon atoms, M is an alkali metal and $x$ is an integer of 1 to 4 under polymerization conditions to produce a polymer containing at least one terminal alkali atom per molecule, contacting said polymer with a silicic compound selected from the group consisting of compounds having 1 silicon atom per molecule, open chain siloxanes having 2 to 12 silicon atoms per molecule, and cyclic siloxanes having 3 to 6 silicon atoms per molecule, said silicic compound containing at least two substituents per molecule selected from the group consisting of halogen, OR, $NR_2$, and SR attached to said silicon atoms with the remaining valences of said silicon atoms attached to an R radical wherein each R is selected from the group consisting of hydrogen, alkyl, cycloalkyl, aryl, aralkyl, and alkaryl radicals containing up to 20 carbon atoms and reacting the resulting polymer with a reagent selected from the group consisting of polyalkali metal organic compounds containing 1 to 20 carbon atoms per molecule, compounds containing at least 2 hydrogen atoms per molecule joined to atoms selected from the group consisting of O, N and S, and, when said substituents attached to said silicon atoms of said silicic compound are other than halogen, monobasic acids.

13. The process of claim 12 wherein said monomer is isoprene and said initiator is a dilithium adduct of isoprene.

14. The process of claim 12 wherein said monomer is 1,3-butadiene, said initiator is 1,2-dilithio-1,2-diphenylethane, said silicic compound is ethyl orthosilicate and said reagent is trimethylene glycol.

15. The process of claim 12 wherein said monomer is isoprene, said initiator is a dilithium adduct of 2,3-dimethyl-1,3-butadiene, said silicic compound is hexaethoxydisiloxane, and said reagent is ammonia.

16. A process for making a polymeric product which comprises contacting a polymer containing at least one terminal lithium atom per molecule and selected from the group consisting of homopolymers of conjugated dienes containing 4 to 12 carbon atoms per molecule and copolymers of said conjugated dienes with copolymerizable monomers containing a $CH_2=C<$ group with from 0.5 to 20 moles per gram atom of lithium in the polymer of a silicic compound selected from the group consisting of compounds having 1 silicon atom per molecule, open chain siloxanes having 2 to 12 silicon atoms per molecule, and cyclic siloxanes having 3 to 6 silicon atoms per molecule, said silicic compound containing at least two substituents per molecule selected from the group consisting of halogen, OR, $NR_2$, and SR attached to said silicon atoms with the remaining valences of said silicon atoms attached to an R radical wherein each R is selected from the group consisting of hydrogen, alkyl, cycloalkyl, aryl, aralkyl, and alkaryl radicals containing up to 20 carbon atoms at a temperature in the range of 0 to 175° F., recovering the resulting silicon-containing polymer, compounding said silicon-containing polymer with pigment, a conventional rubber curvative and a reagent selected from the group consisting of polyalkali metal organic compounds containing 1 to 20 carbon atoms per molecule, compounds containing at least 2 hydrogen atoms per molecule joined to atoms selected from the group consisting of O, N and S, and, when said substituents attached to said silicon atoms of said silicic compound are other than halogen, monobasic acids and curing the thus compounded stocks at a temperature in the range of 100 to 450° F.

17. The process of claim 16 wherein said polymer is a copolymer of butadiene and styrene, said silicic compound is ethyl orthosilicate, said pigment is carbon black, said curative is dicumyl peroxide and said reagent is chloroacetic acid.

18. A polymeric product prepared by the process of claim 1.

19. A polymeric product prepared by the process of claim 6.

20. A cured polymeric stock prepared by the process of claim 16.

21. The process of claim 6 wherein said polymer is polybutadiene, said silicic compound is ethyl orthosilicate and said reagent is chloroacetic acid.

References Cited by the Examiner

UNITED STATES PATENTS

| 2,561,177 | 7/1951 | Barry | 260—4.5 |
| 2,720,495 | 10/1955 | Phreaner | 260—41.5 |
| 2,823,218 | 2/1958 | Speier et al. | 260—45.5 |
| 3,055,952 | 9/1962 | Goldberg et al. | 260—635 |

FOREIGN PATENTS

| 1,170,317 | 9/1958 | France. |

MORRIS LIEBMAN, *Primary Examiner.*

DANIEL ARNOLD, ALEXANDER H. BRODMERKEL,
*Examiners.*